United States Patent [19]

Arvanitakis

[11] 4,052,305

[45] Oct. 4, 1977

[54] METHOD AND APPARATUS FOR CLARIFYING LIQUIDS BY STRAINING

[76] Inventor: Kostas Savas Arvanitakis, 14945 S. Dogwood, Orland Park, Ill. 60462

[21] Appl. No.: 618,139

[22] Filed: Sept. 30, 1975

[51] Int. Cl.² .................... B01D 23/24; B01D 27/12; B01D 29/38; B01D 35/22

[52] U.S. Cl. .................................. 210/79; 210/327; 210/332; 210/358; 210/407; 210/413

[58] Field of Search .............. 210/77, 83, 84, 358, 210/359, 391, 396, 397, 402, 403, 404, 407, 408, 65, 79, 324, 327, 413, 414, 415, 329, 332, 334

[56] References Cited

U.S. PATENT DOCUMENTS

| | | | |
|---|---|---|---|
| 399,984 | 3/1889 | Gessl | 210/402 |
| 465,815 | 12/1891 | Claus | 210/396 |
| 478,093 | 7/1892 | Derham | 210/397 |
| 724,944 | 4/1903 | Roberts | 210/408 |
| 810,020 | 1/1906 | Applegate | 210/396 |
| 1,098,076 | 5/1914 | Adt | 210/403 |
| 2,086,181 | 7/1937 | Bonotto | 210/359 |
| 2,125,472 | 8/1938 | Taylor | 210/403 |
| 2,184,598 | 12/1939 | Jahn | 210/396 |

*Primary Examiner*—Bernard Nozick
*Assistant Examiner*—Frank Sever
*Attorney, Agent, or Firm*—August E. Roehrig, Jr.

[57] ABSTRACT

An automatic self-cleaning liquid clarification system wherein suspended solids are removed from a contaminated liquid. A hollow drum carrying a plurality of brushing elements mounted on its outer periphery scrubs a strainer or screen and elevates the solid contaminants separated by the screen into a pitched auger conveyor which removes additional liquid from the solids materials which are then conveyed in a semi-dry or damp state for discharge.

6 Claims, 4 Drawing Figures

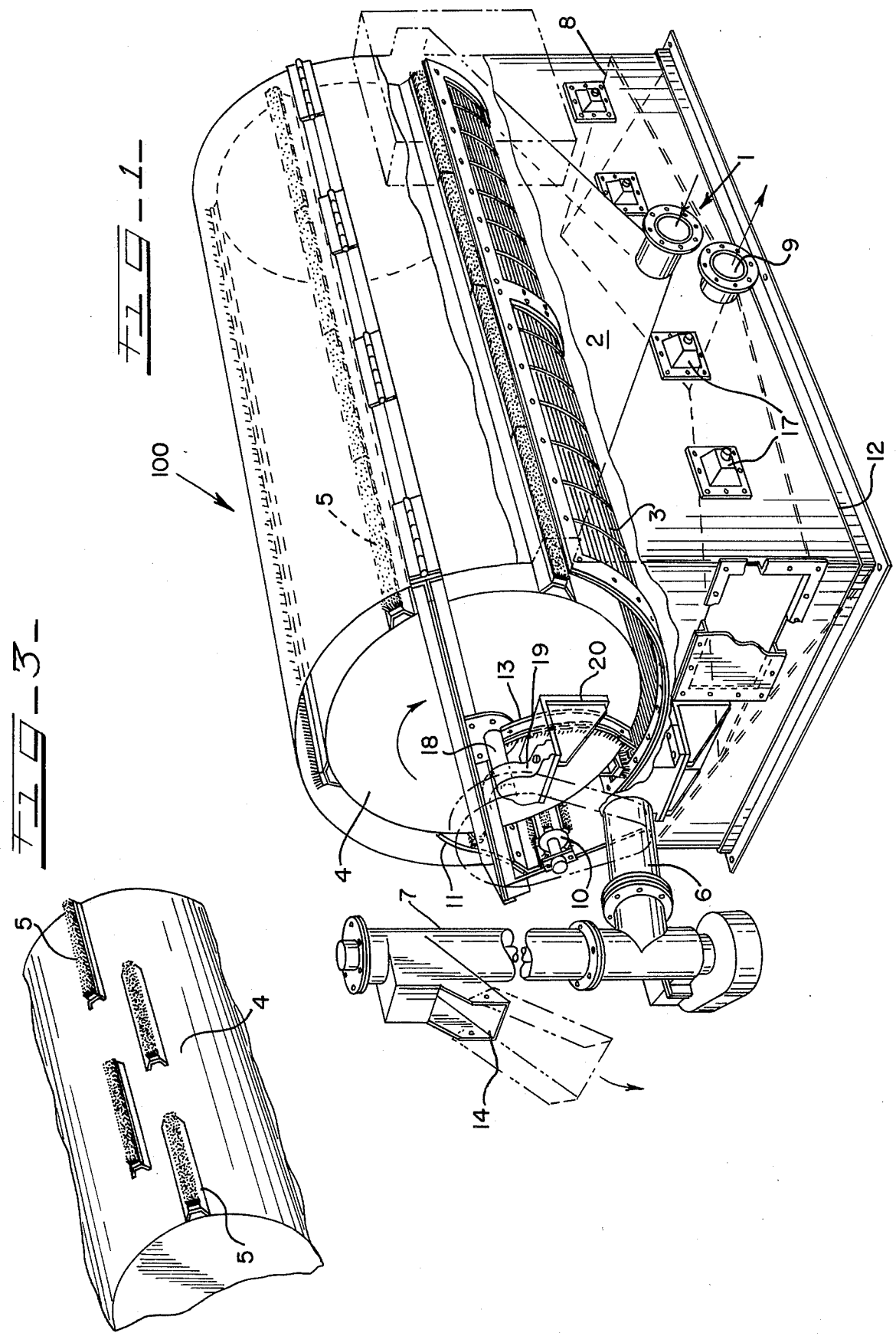

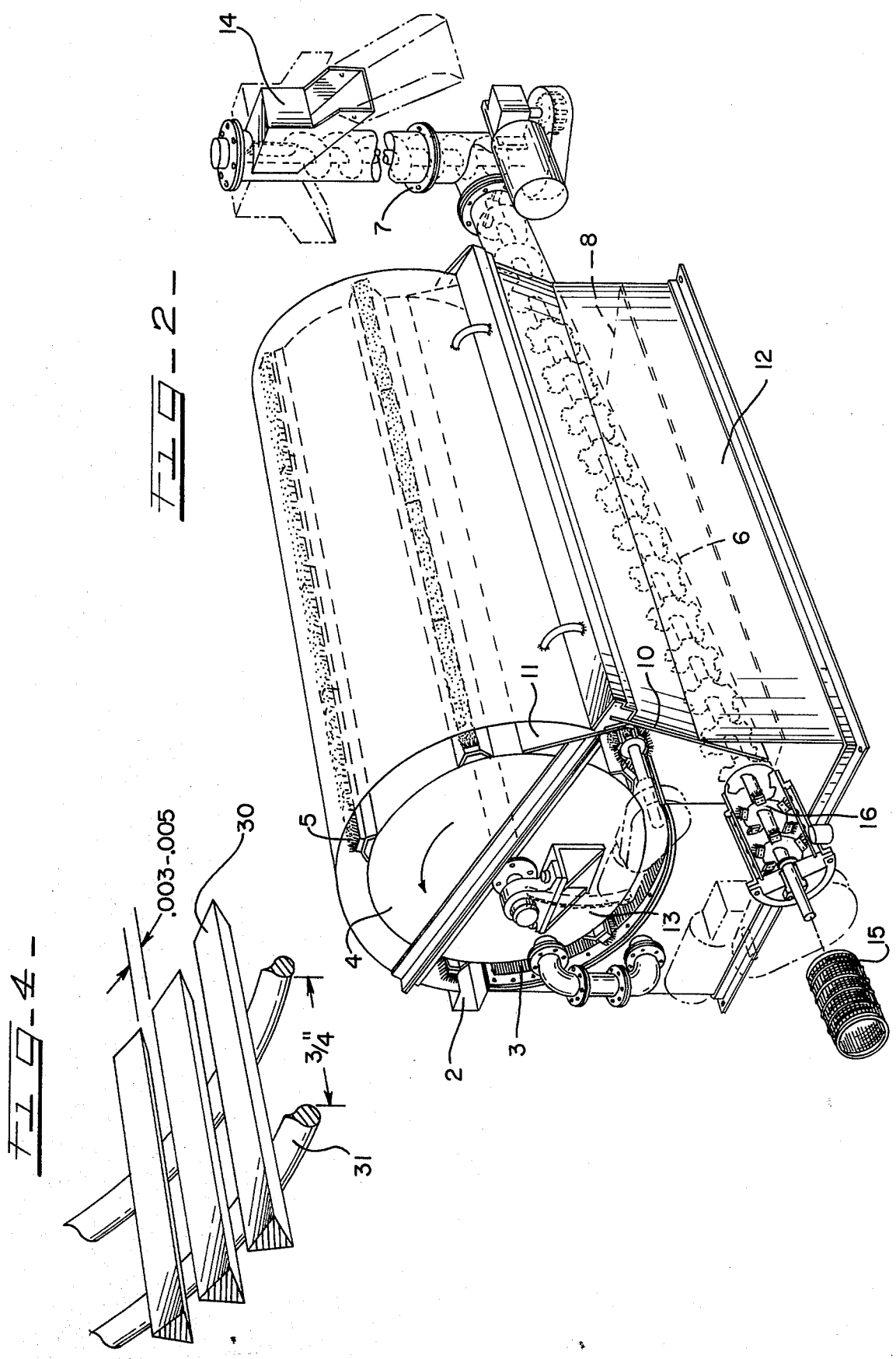

METHOD AND APPARATUS FOR CLARIFYING LIQUIDS BY STRAINING

BACKGROUND OF THE INVENTION

This invention relates in general to separation of solids from liquids and, in particular, to a microstrainer for separating or straining solids materials from the liquid to clarify the liquid and/or recover the solids materials.

More specifically, this invention relates to a microstraining system for separating solids materials from the liquid and removing the solids materials from the microstrainer in a semi-dry or damp state for further use or disposal.

Strainers in general have a wide variety of applications from waste water treatment to all types of industrial applications such as petrochemical, food processing, and materials processing. These applications cover a wide variety of functions from pipe lines to sophisticated engines, anywhere the solids materials may cause malfunction, damage, or must be removed for any other reason. While these strainers are utilized in many and varied applications, the strainers continuously become plugged with the material being separated from the liquid and, thereby, require extensive and expensive cleaning operations in order to maintain the screen in operation. These strainers frequently plug and require dismantling and cleaning of the screening material media which results in a breakdown of operation and high maintenance cost. Cleaning of the accumulated material from the screen requires that the unit be taken off line during cleaning of the screens. Removal of the unit off line interrupts the liquid-solid separation or requires that a second straining apparatus be used in order to provide a continuous uninterrupted separation system.

A number of screens or media have been developed to delay the plugging and to separate the solids mechanically for discharge. One of these is a sieve which incorporates a slotted or wedge construction of delta-type wires welded parallel to each other to form a series of slots. The triangular configuration of the wires allows the solids to go through the strainer after passing through the initial opening thereby preventing plugging. The slots are positioned with the opening in a horizontal position to allow actual rolling of the liquid-solids so that the liquid passes through the slots, but the solids material are rolled away following the screen curve to its lowermost point where they are discharged for disposal. While this type of screen or media is very effective, after a period of time the solids materials will accumulate on the surface plugging the openings and finally requiring that the equipment be cleaned.

Another type of microstraining system incorporates a rotating drum submerged in water to a predetermined level. The liquid to be clarified is passed through the interior of the drum and through the separating media which is installed on the inner peripheral surface. Solids are trapped inside the drum and on the screening media as the drum continuously rotates. At the uppermost portion of the drum interior the materials fall from the drum into a conveyor system utilized to transfer the solids from the interior of the drum for disposal. However, here again these apparatus encounter severe problems of plugging requiring frequent cleaning and high maintenance resulting in an almost prohibitive operating cost.

SUMMARY OF THE INVENTION

It is, therefore, an object of this invention to improve the collection and disposal of solids accumulated in liquid/solid separation systems.

Another object of this invention is efficiently and economically collect and dispose of the solids materials in a semi-dry or completely dry state.

Still another object of this invention is to improve straining devices by continuously moving and dewatering the solids materials collected therein.

These and other objects are obtained in accordance with the present invention where there is provided a microstrainer system wherein contaminated liquid is introduced into the system over a sieve to separate the solids material from the liquid. A series of rotatable brushes are utilized to sweep the material from the sieve in the direction of the liquid flow, dewatering the solids material and passing them into a pitched auger conveyor where they are further drained and conveyed from the system for reuse or disposal.

DESCRIPTION OF THE DRAWINGS

FIG. 1 is a frontal, perspective view of the microstrainer with portions removed to better illustrate the operation and components of the system;

FIG. 2 is a perspective view from the opposite side of the microstrainer to better illustrate the conveyor system for draining the solids material and conveying it from the apparatus;

FIG. 3 is an alternative embodiment of the brush configuration; and

FIG. 4 is a mechanical schematic of the construction of the strainer and unit for removing the solids material from the liquid.

DESCRIPTION OF A PREFERRED EMBODIMENT

Referring now to FIG. 1 there is shown a microstrainer constructed in accordance with the present invention. Contaminated liquid is collected in a central reservoir and pumped or fed by gravity into the microstrainer for clarification and separation of the solids materials from the liquid. The contaminated liquid is introduced through inlet 1 when the microstrainer is automatically activated so that a drum 4 carrying a series of brushes 5 rotates at a slow speed (1–5 RPM) to brush and continuously clean a screen media 3. The liquid to be clarified is introduced through inlet 1 into a head box 2 where the contaminated liquid fills the head box and overflows onto the screening media 3 and gravitationally flows across the screen surface.

The drum 4 rotates in the same direction as the liquid flow across the screening surface, and the brushing of the screen transfers the solids materials into a pitched horizontal auger 6 which feeds and drains the solids material before it is passed to a vertical auger 7 whereat the materials are removed from the system.

The drum 4 is a hollow, rotatable cylinder rotatably supported upon a shaft 18 carried in a suitable bearing 19 supported by a frame 20 appropriately secured to the machine frame. The brushes 5 are appropriately secured to the outer peripheral surface of the drum 4 in a position to contact the straining element or sieve 3 for wiping the solids materials from the sieve surface.

As the liquid flows over the screening media 3, the liquid passes though the screen openings and into the bottom chamber 8 of the microstrainer to be drained by gravity through an outlet 9. The solids material trapped on the upper surface of the screening are brushed and carried along the curved screening surface by the brushes 5 mounted on the drum 4. The brushes carry the solids material along the curved screen surface and elevate the solids beyond the lowermost point of the curved screening media to a position approximately half way up the drum side or approximately equal distance to the drum's axis of rotation.

This brushing of the solids material maintains the screening surface clean and the elevation of the solids materials above the lowermost point allows the solids material to be drained prior to being conveyed over the edge of he screening media into the upwardly pitched horizontal auger 6, which conveys the solids material outwardly from the microstrainer.

In certain applications having a high quantity of flow rate of the contaminated liquid, the conveing brushes 5 are positioned on the drum 4 in a different manner. As shown in FIG. 3 an overlapped staggering of the brushes 5 allows the higher quantity of flow rate to be handled without the brushes forming an impediment to the water flow. In this configuration the brushes are set a predetermined distance apart and overlapping each other to completely travel over all the surface of the screening media while allowing a path of liquid flow between the individual brushes.

The screening media 3 is formed in a configuration best shown in FIG. 4. A series of parallel spaced wires 30 are supported on a frame and extend in a direction transverse to the liquid flow. The wires 30 are triangularly shaped in cross-section and preferably spaced from each other to form an opening of approximately 0.003 – 0.005 spacing therebetween, allowing for normal tolerances with these limits. Such material is available from Johnson Division, Universal Oil Products Company, P.O. Box 311, St. Paul, Minn. 55165, and sold as No. 63 wire. A series of support wires 31 are spaced approximately ¾ inch apart in a direction transverse of the wire openings. Such wire, which is "tear drop" shaped in cross-section, is also available from Johnson as Wire No. 156. The triangular shaped wires are positioned with the "base" upward to contact the liquid, and the support wires are shaped with the apex of the "tear drop" abutting the apex of the "triangular" shaped wires. In this manner solids material will accumulate on the upper surface of the strainer, and the liquid will pass therethrough. This configuration allows utilization of the Coanda effect, whereby the liquid will cling to the surface of the striner elements. The effect is frequently seen around the eaves of a house when water appears to defy gravity as it runs along the inner surface of the eaves. In this manner the contaminated liquid clings to the strainer surface until it reaches the joinder of the apex of the triangular shaped wire with its support wire running off into chamber 8, while the solids material remain on the "base" of the wire. When the drum 4 rotates the brushes sweep the accumulated solids material from the surface of the strainer and convey the solids material upwardly into a pitched horizontal auger having notched auger flights to allow any liquid in the materials to drain downwardly while the solids are being conveyed in an opposite upward direction into the vertical auger 7 for discharge.

Any solids material remaining in the conveying brushes 5 are removed by means of a cleaning brush system 10 comprised of series of small brushes mounted on a rotating shaft. The cleaning brushes are positioned adjacent to the drum 4 and in contact with the conveying brushes 5 as they are rotated. The brushes 10 rotate in a direction opposite to the drum rotation thereby removing any solids that may remain on the surface of the brushes 5 after being removed from the screen 3. The contact of the cleaning brush 10 with the conveying brushes 5 also straightens the conveying brush bristles 5 to maintain them in a predetermined position and preventing their becoming curved from contact with the screen 3.

A long, flexible wiper 11 is carried inside the microstrainer enclosure or cabinet 12 and positioned above the cleaning brushes 10 to wipe and clean the surface of the rotating drum 4. The wiper 11 removes any solids which might be present on the drum surface. A pair of flexible wipers 13 carried inside the microstrainer enclosure 12 at each end of the rotating drum 4 wipes and cleans the ends during rotation to remove any solids material which might be present thereon.

When the solids materials has been removed from the liquid and drained, the conveying brushes 5 convey the material to the horizontal auger 6. This solids material is then slowly conveyed forward and upward by the rotating augers which rotate at approximately 40–50 RPM further draining the solids material. Any liquid drained from the liquid from auger 6 passes through screens 15 positioned at the lowermost end of the auger system. A series of brushes 16 are mounted to the lowermost flights of the auger 6 to clean the screen 15 to prevent clogging by any solids material which might be present in the liquid as it drains.

If it is desired to completely dry the solids material transferred to the vertical auger, the vertical auger may be heated by means of steam jackets or any other suitable means such as an electrical resistance heat system. The heating of the solids material will further dry the solids as it is conveyed upwardly by the auger for discharge.

Depending upon the type of contaminated liquid or the solids material therein, an ultra-violet germacidal lamp 17 is utilized to destroy micro-organisms on the screening media 3. These lamps are installed in a liquid tight manner in the microstrainer cabinet 12.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. A liquid solid separation microstrainer apparatus for removing suspended solids material from a contaminated liquid passed into the apparatus comprising a rotatable drum straining means for separating solid material from a liquid, passing the liquid therethrough and retaining the solids material on the surface thereof,
said straining means positioned adjacent to the inlet for contaminated liquid and extending downwardly therefrom to a lowermost point and then upwardly to a discharge position above said lowermost point, brushing means carried by said rotatable drum for conveying the solids materials from the surface of said straining means positioned adjacent the surface thereof and in engagement therewith, conveyor means for removing and draining solids material passed thereto positioned adjacent the discharge position of said strainer means to receive solids material conveyed thereto by said brushing means, said conveyor means positioned to forward solids material passed thereto and to drain liquid therefrom, and means for discharging solids material from said conveyor means.

2. The apparatus of claim 1 wherein said straining means are positioned in a curved configuration and said brushing means is supported from a drum rotatable in a path of movement substantially parallel to said curved straining means.

3. The apparatus of claim 2 further including means positioned to engage said brushing means to remove accumulated solids therefrom.

4. The apparatus of claim 1 wherein said conveyor means for moving and draining solids material passed thereto comprises an upwardly pitched auger having notches in auger flight to permit liquid to gravitationally drain in a direction opposite to the movement of solids material through the auger.

5. The method of liquid/solid separation in a microstrainer comprising passing contaminated liquid bearing suspended solids material therein over a separating medium, gravitationally straining contaminated liquid through teh separating medium removing the suspended solids material therefrom and passing the clarified liquid therethrough, brushing the suspended contaminants from the surface of said separating medium and conveying sad contaminants upwardly to permit gravitational separation of liquid contained therewith by brushing means carried by a rotatable drum of the microstrainer, and conveying said solids material for disposal.

6. The method of claim 5 wherein said step of brushing said surface of the separating medium comprises conveying the solids material thereacross and draining liquid therefrom.

* * * * *